April 7, 1942.  W. G. KÖGEL  2,278,998
REFRIGERATION
Filed Dec. 14, 1938
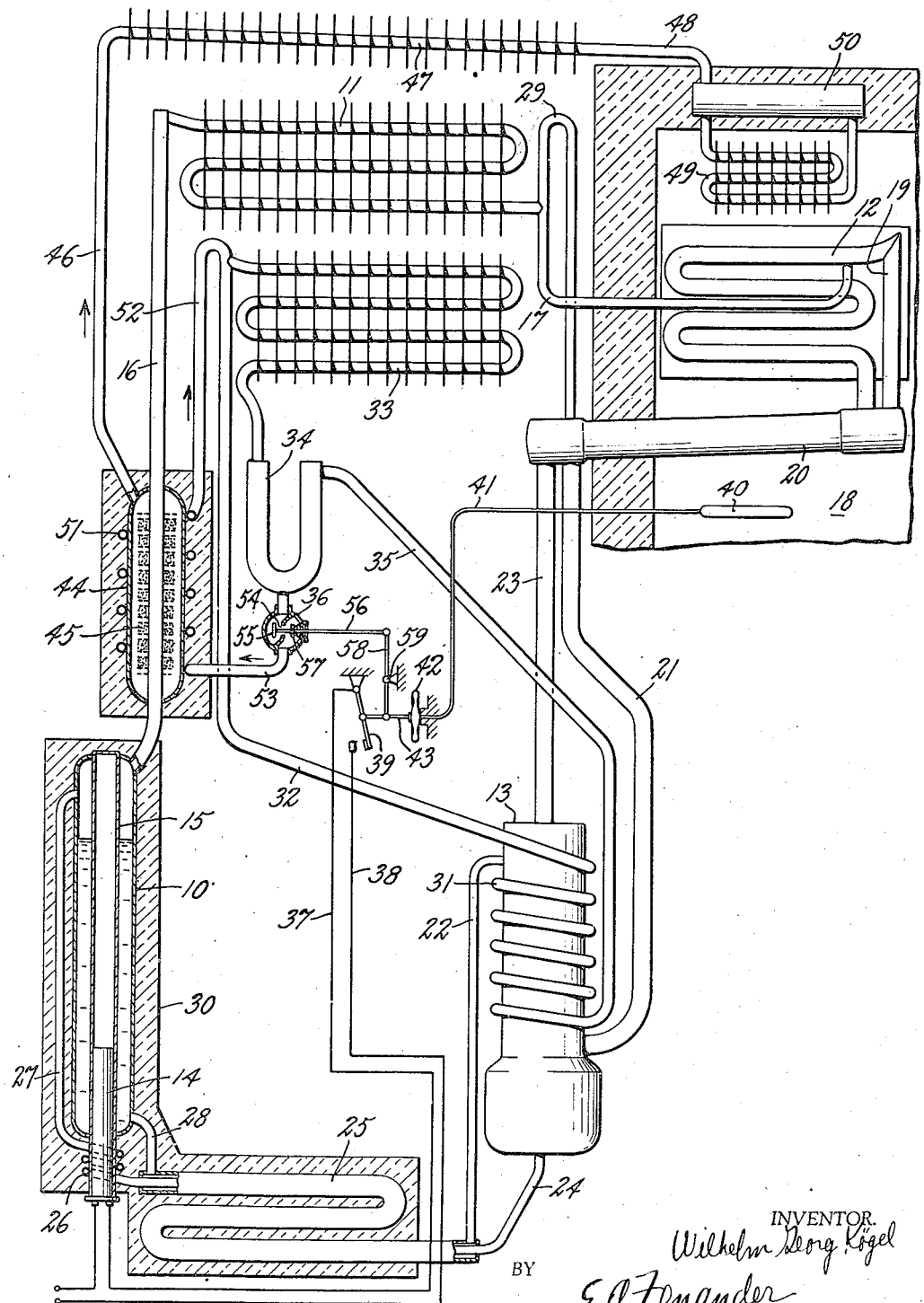
INVENTOR.
Wilhelm Georg Kögel
BY
Ed Fenander
his ATTORNEY.

Patented Apr. 7, 1942

2,278,998

UNITED STATES PATENT OFFICE 2,278,998

REFRIGERATION

Wilhelm Georg Kögel, Evansville, Ind., assignor, by mesne assignments, to Servel, Inc., New York, N. Y., a corporation of Delaware Application December 14, 1938, Serial No. 245,579
In Germany January 17, 1938

11 Claims. (Cl. 62—5)

This invention relates to refrigeration, and more particularly to improvements for increasing the efficiency of refrigeration apparatus.

This is accomplished by modifying a refrigeration system by the addition of a separate intermittent system in which one or more parts thereof are in heat exchange relation with the first-mentioned system in such a manner that waste heat from the first-mentioned system is utilized to heat the intermittent system. More specifically, a first refrigeration system of the absorption type is modified by the addition of an intermittent system so that rectification of vapors produced by the heat in the generator of the first system is improved, and the heat of rectification is utilized to heat the separate intermittent system. By this arrangement, heat of rectification that would otherwise be lost is recovered and a greater amount of refrigeration is produced than by a single refrigeration system operating alone, since the intermittent system produces a refrigerating effect when the refrigerating effect by the first mentioned system is reduced.

The first or primary refrigeration system may be of the continuous absorption type. When such a system is automatically controlled by a thermostat in response to a temperature condition, the production of refrigeration by the intermittent system will prolong the intervals when the heat supply to the first system is reduced or shut off. Also, in accordance with this invention, a fluid heat transfer circuit for dissipating heat from a heat rejecting part of the first system may be constructed and arranged to effect cooling of the generator-absorber of the intermittent system when heating thereof by waste heat is stopped. This is advantageous in that quick cooling of the generator-absorber is effected to instigate the production of refrigeration by the intermittent system when the refrigeration produced by the first system is reduced.

The invention will be better understood upon reference to the following description and the accompanying drawing forming a part of this specification, and in which the figure more or less diagrammatically illustrates refrigeration apparatus embodying the invention.

In the drawing the invention is applied to an absorption refrigeration system of a uniform pressure type containing a pressure equalizing gas. It is to be understood, however, that the invention is not limited to the specific refrigeration apparatus shown and hereinafter described. The system includes a generator 10, condenser 11, evaporator 12, and an absorber 13. The system contains a solution of refrigerant in absorption liquid, such as ammonia in water, for example, and also an auxiliary agent, or inert gas, such as hydrogen.

The generator 10 is heated in any suitable manner, as by an electrical heating element 14, which is fitted in the lower open end of a sleeve 15. By heating generator 10, refrigerant vapor is expelled out of solution and flows upward through a conduit 16 into condenser 11. In condenser 11 refrigerant vapor is condensed into liquid which flows therefrom through a conduit 17 into the upper part of evaporator 12. Evaporator 12 may be located in a thermally insulated space 18.

Liquid refrigerant in evaporator 12 evaporates and diffuses into hydrogen which enters through a conduit 19, thereby producing a refrigerating effect. The rich gas mixture of refrigerant vapor and hydrogen formed in evaporator 12 flows from the lower part thereof through a first passage of a gas heat exchanger 20 and conduit 21 into the lower end of absorber 13.

In absorber 13 the rich gas mixture flows counter-current to downwardly flowing weak absorption liquid which enters through a conduit 22. The absorption liquid absorbs refrigerant vapor from the hydrogen and hydrogen weak in refrigerant vapor flows from absorber 13 through a conduit 23, a second passage of gas heat exchanger 20, and conduit 19 into the upper part of evaporator 12.

The circulation of gas in the gas circuit just described is due to the difference in specific weight of the columns of rich and weak gas. Since the rich gas is heavier than the weak gas, force is produced within the system for causing flow of rich gas toward absorber 13 and flow of weak gas toward evaporator 12.

Enriched absorption liquid flows from absorber 13 through a conduit 24 and an inner passage of a liquid heat exchanger 25 to a coil 26 which is disposed about the lower end of sleeve 15. Liquid is raised by vapor-lift action from coil 26 through a tube 27 into the upper part of generator 10. Refrigerant vapor expelled out of solution in generator 10, together with refrigerant vapor entering through tube 27, flows upwardly through conduit 16 into condenser 11, as explained above.

The weakened absorption liquid from which refrigerant has been expelled flows from generator 10 through a conduit 28, an outer passage of liquid heat exchanger 25, and conduit 22 into the upper part of absorber 13. This circulation of absorption liquid is effected by raising of liquid by vapor-lift action in generator 10.

A vent conduit 29 is connected to the lower end of condenser 11 and to the gas circuit, as at one end of gas heat exchanger 20, for example. Conduit 29 extends upwardly from the lower end of condenser 11 and then downwardly to gas heat exchanger 20, whereby any gas which may pass through condenser 11 can flow to the gas circuit and not be trapped in the condenser. The generator 10 and liquid heat exchanger 25 are preferably embedded in suitable insulation 30, as diagrammatically shown in the drawing.

The absorber 13 constitutes a heat rejecting part of the refrigeration system due to the heat of absorption which is liberated with absorption of refrigerant vapor by the absorption liquid. To effect cooling of absorber 13 a closed fluid heat transfer circuit is provided which includes a coil 31 disposed about and in thermal exchange relation with the absorber. The heat transfer circuit may be partly filled with a volatile liquid which evaporates in coil 31. The vapor flows from coil 31 through a conduit 32 to a looped coil 33 which is provided with fins for air-cooling. The vapor is condensed in coil 33 and the condensate flows therefrom by gravity through a U-shaped trap 34 and conduit 35 back to the coil 31. The coil 31 constitutes a vaporization portion and the coil 33 constitutes a condenser portion of a closed fluid circuit in which natural circulation of fluid takes place. The vaporization of liquid in coil 31 withdraws heat from absorber 13 and the condensation of the vapor in coil 33 gives up heat to the surrounding air. When the heat transfer circuit is operating to cool absorber 13 valve 36, hereinafter to be described, remains closed. When the liquid level in trap 34 rises to the connection of conduit 35 liquid will flow through the latter to coil 31.

The heating element 14 is adapted to be connected to a source of electrical supply by conductors 37 and 38. A switch 39 is connected to these conductors for connecting and disconnecting the heating element 14 to and from the source of electrical supply. The switch 39 is arranged to be operated automatically by an expansible fluid thermostat. The thermostat includes a thermal element 40 which is located in space 18. The thermal element 40 is connected by a tube 41 to an expansible and contractible diaphragm 42 which is arranged to be adjustably supported in any suitable manner. The diaphragm 42 is connected by a member 43 to operate switch 39. The expansible fluid thermostat contains a suitable volatile fluid, as is well-known in the art, and operates switch 39 to connect and disconnect electrical heating element 14 to and from the source of electrical supply, whereby space 18 is maintained at a substantially constant temperature or temperature range.

In accordance with this invention, in order to recover heat that would otherwise be lost in the primary system just described, a generator-absorber 44 of a separate hermetically sealed intermittent refrigeration system is embedded in insulation and arranged in heat exchange relation with conduit 16. The generator-absorber 44 may contain a solid absorbing agent 45, for example, calcium chloride, strontium chloride, lithium nitrate or the like, suitably treated as known in the art, or any of various known solid absorbents, particularly those including an element of the halogen group.

To the generator-absorber 44 is connected a vertical conduit 46 which is connected at its upper end to a condenser 47. The condenser is connected by a conduit 48 to an evaporator 49 including a loop connected to a receiver 50. The loop of evaporator 49 is also arranged in the thermally insulated storage space 18. Any suitable refrigerant may be employed in the intermittent refrigeration system, such as, methylamine, for example.

A coil 51 is arranged about and in thermal exchange relation with generator-absorber 44. The coil 51 is connected by a conduit 52 to the upper part of looped coil 33, and by a conduit 53 to the lower part of trap 34. In conduit 53 is connected the hermetically sealed valve 36. The valve 36 includes a casing provided with a partition having a port 54 which is adapted to be closed by a valve member 55. The valve member 55 is provided with a stem 56 which is connected by a bellows 57 to the inside of the valve casing. The outer end of stem 56 is pivotally connected to one end of a link 58. The link 58 is pivoted intermediate its ends at 59 and the lower end thereof is pivotally connected to member 43.

When the expansible fluid thermostat operates to close switch 39 the valve member 55 is closed; and, conversely, when the expansible fluid thermostat operates to open switch 39 the valve member 55 is opened.

Let us first consider the operation of the intermittent system during operation of the primary system and when the switch 39 is closed. Under these conditions refrigerant vapor is expelled from absorption solution in generator 10 and condenses in air-cooled condenser 11. Condensate flows from the condenser through conduit 17 into evaporator 12, whereby the liquid evaporates and diffuses into hydrogen to produce a refrigerating effect to keep space 18 at a desired low temperature.

The generator vapor usually is a mixture of refrigerant vapor and absorption liquid vapor. When ammonia and water are employed as the refrigerant and absorption liquid, for example, the generator vapor usually is a mixture of ammonia vapor and water vapor. Due to the difference in boiling points of ammonia and water, the water vapor may be removed from ammonia by cooling the mixture to condense out the water. This is usually termed rectification and the latent heat of condensation resulting from condensation of water vapor is referred to as heat of rectification.

By flowing the generator vapor in heat exchange relation with generator-absorber 44, heat of rectification is effectively utilized to cause expulsion of methylamine from the absorbent. The methylamine vapor flows through conduit 46 into air-cooled condenser 47 in which it is condensed. The condensate flows from condenser 47 into evaporator 49 and accumulates therein.

During the high pressure vapor expulsion period of the intermittent system, valve 36 is closed and no heat transfer fluid can flow from trap 34 into coil 51. The fluid heat transfer circuit therefore operates in the usual manner to withdraw heat of absorption from absorber 13 at coil 31 and give up heat to surrounding air at coil 33.

When space 18 tends to fall below the desired low temperature, the diaphragm 42 of expansible fluid thermostat contracts to open switch 39 and disconnect heating element 14 from the source of electrical supply. This shuts off the heat supply to generator 10 and the expulsion of generator vapor stops, thereby reducing the refrigerating effect produced by evaporator 12. When switch 39 opens the valve 36 also opens, whereby liquid in the heat transfer circuit can now flow from trap 34 into coil 51.

Since generator-absorber 44 is at a relatively high temperature, volatile liquid in coil 51 evaporates and the vapor thus formed flows to coil 33 in which it is condensed. The condensate flows into trap 34 and returns through conduit 53 into coil 51. The evaporation of volatile liquid in coil 51 withdraws heat from generator-absorber 44 and the condensation of vapors in coil 33 gives up heat to surrounding air. Thus the generator-absorber is quickly cooled to instigate an absorption period of the intermittent system.

At the beginning of the lower pressure absorption period the evaporator 49 contains the secondary refrigerant. Since generator-absorber 44 can readily dissipate heat to the atmosphere by means of the closed fluid heat transfer circuit, refrigerant is absorbed therein, the refrigerant flowing from evaporator 49 through condenser 47 and conduit 46 into the generator-absorber. The refrigerant in evaporator 49 is vaporized and withdraws heat from its surroundings thereby producing a refrigerating effect.

The refrigeration produced by evaporator 49 prolongs the interval of time when no heat is supplied to generator 10 by heating element 14. Stated another way, a longer interval of time will elapse before the expansible fluid thermostat will again operate to close switch 39 and start operation of the primary refrigeration system due to rise of temperature in space 18. In this manner additional refrigeration is produced without additional operating cost.

The intermittent system may be constructed to keep substantially the same desired low temperature in space 18 as the primary evaporator 12 or the intermittent system may be constructed to even lower the temperature in space 18. Evaporator 49 may be constructed as a freezing unit for freezing ice cubes and the like, if desired. In such case the expansible fluid thermostat may be arranged to disconnect the heat supplied to generator 10 at a higher temperature than the desired low temperature or temperature range at which it is desired to keep space 18. When evaporator 49 produces a refrigerating effect the temperature of space 18 will then be brought down to the desired low value.

The invention can be carried out in many ways whereby waste heat of a refrigeration system is recovered and utilized to supply heat to an intermittent refrigeration system. The heat of rectification represents waste heat because a part of the heat supply to the generator usually produces absorption liquid vapor which is subsequently condensed out of the refrigerant vapor. The use of heat of rectification is particularly advantageous because the heat is transmitted to the generator-absorber of the intermittent system at a relatively high temperature. Further, by effecting rectification of the vapors in this manner the composition of the refrigerant vapors condensed in condenser 11 and flowing to evaporator 12 is improved and maintained practically constant. Likewise, when a solid absorbing agent, such as calcium chloride, is employed in the intermittent system, the composition of the vapors flowing to condenser 47 also remains substantially constant.

In place of a solid absorbing agent in the intermittent system a liquid absorbent agent may also be employed. Among such liquid absorbent agents, for example, are aqueous ammonia solution, an aqueous or ammoniacal solution of lithium nitrate, ammonium thiocyanate, ammonium nitrate or the like.

Although a single embodiment of the invention has been shown and described, it will be apparent to those skilled in the art that various modifications and changes may be made without departing from the spirit and scope of the invention.

What is claimed is:

1. The combination with a refrigeration system of the absorption type in which refrigerant fluid is distilled from solution in a liquid solvent and including a rectifier, of an intermittent refrigeration system including a generator arranged in heat transfer relation with said rectifier so as to be operated by heat input from the rectification of the distillation vapor.

2. The combination with a primary refrigeration system of the absorption type in which refrigerant fluid is distilled from solution in a liquid solvent and including a rectifier, of a secondary refrigeration system including a generator arranged in heat transfer relation with said rectifier so as to be operated by heat input from the rectification of the distillation vapor.

3. The combination with a refrigeration system having at least two parts from which heat is dissipated, of an intermittent refrigeration system operated by heat input from one of said parts from which heat is dissipated, a fluid transfer system in which a heat transfer fluid is adapted to flow and including one portion in heat exchange relation with said intermittent system and another portion in heat exchange relation with another of said parts, and control means to flow heat transfer fluid alternately in said portions.

4. The combination with a first refrigerating system having a part where heat is dissipated from the system, all of such dissipated heat when not utilized representing a total loss affecting the efficiency of the system, of a second refrigerating system operatively associated with said first system to provide a compound refrigerating system, and said second system being operatively associated with said first system so that said second system is operated by heat dissipated by said part.

5. The combination with a refrigeration system of the absorption type having a cooling element, a generator in which refrigerant fluid is distilled from solution in a liquid solvent, and a heater, the aforementioned system dissipating heat due to rectification of distillation vapor, of an intermittent refrigeration system operated by heat input from the rectification of the distillation vapor, said intermittent system including an evaporator and a generator-absorber, control means to control said heater, cooling means to facilitate cooling of said generator-absorber, and means operatively associated with said control means to render said cooling means inoperative when said intermittent refrigeration system is being heated by heat input from the rectification of the distillation vapor.

6. The combination set forth in claim 5 in which said control means operates responsive to a temperature condition affected by said cooling element and said evaporator.

7. The combination with a first refrigeration system of the absorption type having a heat dissipating part, a cooling element, a generator in which refrigerant fluid is distilled from solution in a liquid solvent, a rectifier and a heater, of an intermittent refrigeration system operated by heat input from said rectifier, said intermittent system including an evaporator and a generator-absorber, control means to control said heater, cooling means including a fluid heat transfer circuit having one part in heat exchange relation with said generator-absorber and another part in heat exchange relation with said heat dissipating part, and means operatively associated with said control means to cause a preponderance of heat transfer fluid to flow through said other part when said intermittent refrigeration system is being heated by heat input from said rectifier, and to cause a preponderance of heat transfer fluid to flow in said one part when the heating effected by said heater is reduced.

8. The combination set forth in claim 7 in which said fluid heat transfer circuit comprises a closed system containing a volatile fluid and having a condensation portion and vaporization portions, said one part and said other part constituting said vaporization portions.

9. A method of refrigeration which includes heating a solution of refrigerant and absorption fluids to expel vaporous refrigerant fluid from the solution, removing heat from the expelled vapor to cause condensation of vaporous absorption fluid, condensing the refrigerant fluid to liquid subsequent to the step of condensing vaporous absorption fluid, evaporating the condensed liquid to produce refrigeration, transferring said removed heat to expel another refrigerant vapor from an absorbent, condensing the second refrigerant vapor to liquid, and evaporating the liquid to produce refrigeration.

10. Refrigeration apparatus of the absorption type comprising a first refrigeration system including a condenser, an absorption liquid circuit having a generator, and a rectifier forming a portion of a conduit for vapors from said generator to said condenser, and a second refrigeration system including an evaporator, a generator, and a conduit connecting said evaporator and the last-mentioned generator, said second refrigeration system being separate from said first refrigeration system, and said generator in said second refrigeration system being in heat exchange relation with said rectifier in said first refrigeration system.

11. That improvement in refrigeration which consists in utilizing rectification of vapor in one system capable of producing a refrigerating effect to expel a refrigerant from an absorbent in a second system in itself capable of producing a refrigerating effect.

WILHELM GEORG KÖGEL.